United States Patent
Yoshida (10) Patent No.: US 10,407,108 B2
(45) Date of Patent: Sep. 10, 2019

(54) AUTOMOBILE HOOD STRUCTURE AND HOOD INNER PANEL THEREOF

(71) Applicant: Kobe Steel, Ltd., Kobe-shi (JP)

(72) Inventor: Masatoshi Yoshida, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 165 days.

(21) Appl. No.: 15/127,680

(22) PCT Filed: Feb. 27, 2015

(86) PCT No.: PCT/JP2015/055803
§ 371 (c)(1),
(2) Date: Sep. 20, 2016

(87) PCT Pub. No.: WO2015/146479
PCT Pub. Date: Oct. 1, 2015

(65) Prior Publication Data
US 2018/0170436 A1    Jun. 21, 2018

(30) Foreign Application Priority Data

Mar. 26, 2014  (JP) .................................. 2014-063771

(51) Int. Cl.
*B62D 25/10* (2006.01)
*B62D 21/15* (2006.01)
*B62D 25/12* (2006.01)

(52) U.S. Cl.
CPC ........... *B62D 25/105* (2013.01); *B62D 21/15* (2013.01); *B62D 25/12* (2013.01)

(58) Field of Classification Search
CPC .................................................. B62D 25/105
USPC ..................... 296/193.11; 180/69.2, 69.21
See application file for complete search history.

(56) References Cited

U.S. PATENT DOCUMENTS

| 2005/0280287 A1 | 12/2005 | Koura |
| 2012/0285759 A1 | 11/2012 | Ikeda et al. |
| 2013/0015682 A1 | 1/2013 | Ikeda et al. |

FOREIGN PATENT DOCUMENTS

| CN | 102695643 A | 9/2012 |
| CN | 203064043 U | 7/2013 |
| JP | 11-198858 A | 7/1999 |
| JP | 2003-54449 A | 2/2003 |
| JP | 2006-1500 A | 1/2006 |
| JP | 2006-315555 A | 11/2006 |
| JP | 2006-315556 A | 11/2006 |

(Continued)

OTHER PUBLICATIONS

International Search Report and Written Opinion dated Mar. 31, 2015 in PCT/JP15/055803 Filed Feb. 27, 2015.

*Primary Examiner* — Dennis H Pedder
(74) *Attorney, Agent, or Firm* — Oblon, McClelland, Maier & Neustadt, L.L.P.

(57) ABSTRACT

A hood inner panel of an automobile hood structure includes: an outer peripheral skeleton portion disposed at an outer peripheral portion and having an annular shape, the skeleton portion having a recessed-top cross sectional shape orthogonal to the circumferential direction of the annular shape; and an outer proximal surface extending inwardly from the outer peripheral skeleton portion and mastic-joined with a hood outer panel. A vertical wall connecting the outer proximal surface and a bottom surface of the outer peripheral skeleton portion includes a plurality of trim holes except for a ridge line where the vertical wall and the bottom surface meet and for the bottom surface.

7 Claims, 4 Drawing Sheets

(56) References Cited

FOREIGN PATENT DOCUMENTS

| | | |
|---|---|---|
| JP | 3957874 B2 | 8/2007 |
| JP | 2008-24185 A | 2/2008 |
| JP | 2008-24192 A | 2/2008 |
| JP | 2008-24193 A | 2/2008 |
| JP | 2008-68729 A | 3/2008 |
| JP | 2008-296793 A | 12/2008 |
| JP | 4200907 B2 | 12/2008 |
| JP | 2013-43471 A | 3/2013 |
| WO | 2011/080835 A1 | 7/2011 |
| WO | 2011/118016 A1 | 9/2011 |

AUTOMOBILE HOOD STRUCTURE AND HOOD INNER PANEL THEREOF

TECHNICAL FIELD

The present invention relates to an automobile hood structure and a hood inner panel thereof that are excellent in pedestrian head protecting performance during a collision with a pedestrian and hood rigidity.

BACKGROUND ART

A typical automobile hood inner panel often has such a structure that its outer peripheral portion is joined by folding an hood outer panel (hem working) and it has therein an outer peripheral skeleton portion disposed at the outer peripheral portion and having a substantially annular shape, the skeleton portion having an recessed-top cross sectional shape orthogonal to the circumferential direction of the annular shape, and an outer proximal surface extending inwardly from the outer peripheral skeleton portion and mastic-joined with the hood outer panel. A hinge and a striker are joined to the bottom surface of such an outer peripheral skeleton portion, and a cushion rubber seating surface or the like is formed on the bottom surface of such an outer peripheral skeleton portion, and the bottom surface of such an outer peripheral skeleton portion is connected to or supported by an automobile body under the hood with these therebetween.

The outer peripheral skeleton portion of the hood inner panel forms, together with the hood outer panel, a substantially annular frame structure on the outer periphery of the hood panel, thereby ensuring the rigidity as a hood. In order to increase this rigidity, it is required to deepen and widen the recessed shape of the outer peripheral skeleton portion without interfering with other parts, and without influencing the collision performance such as pedestrian protection or frontal collision performance, or panel rigidity, dent resistance, and the like.

On the other hand, the outer proximal surface extending inwardly from the outer peripheral skeleton portion and mastic-joined with the hood outer panel is provided for the purpose of ensuring the panel rigidity and dent resistance of the hood. In order to ensure these performances in a wide range, it is desired to set the position of mastic-joining with the hood outer panel as close as possible to the outer peripheral portion. For this reason, in order to achieve both hood rigidity and panel rigidity or dent resistance, the angle of a vertical wall connecting the outer proximal surface and the bottom surface of the outer peripheral skeleton portion is often set relatively steep.

However, it is problematic that the steeper the angle of the vertical wall, the less likely the vertical wall is to deform during a pedestrian head collision. Since, as described above, the outer peripheral portion of the hood is connected to or supported by the body of the automobile with a hinge, a striker, cushion rubber, or the like therebetween, the hood itself is less likely to move downward. For this reason, collision energy needs to be absorbed efficiently at a short distance between the bottom surface of the outer peripheral skeleton portion that is connected to the body of the automobile and the hood outer panel. If, in this case, the deformation of the hood inner panel such as the vertical wall described above is less likely to occur, the hood inner panel does not sufficiently deform during pedestrian head collision, a secondary peak is generated in the acceleration during the collision, and the head injury criteria (HIC) value worsens.

To solve such a problem, some approaches are proposed in which, in the vertical wall on the front side of the hood, a shelf portion triggering deformation is provided in the middle of the vertical wall, and the deformation during a pedestrian head collision is thereby promoted to ensure the pedestrian protection performance (see, for example, PTLs 1 and 2).

Some cases are proposed in which, in order to reduce the HIC value during a pedestrian head collision, a weakening portion such as a folding line or a slit is set in the vertical wall although these cases are intended for a lock reinforcing material or dent reinforcing material disposed on the front side of the hood (see, for example, PTLs 3 and 4).

A structure is proposed in which a trim hole including the bottom surface of the outer peripheral skeleton portion is set in the vicinity of a corner part of the vertical wall (see, for example, PTL 5).

Some structures are proposed in which for the purpose of providing a weakening portion in part of the hood inner panel to improve the collision performance such as pedestrian protection performance, a trim hole is set in the vicinity of a bead setting part in the center of the hood inner panel (see, for example, PTLs 6 to 14).

CITATION LIST

Patent Literature

PTL 1: Japanese Unexamined Patent Application Publication No. 2008-296793
PTL 2: Japanese Unexamined Patent Application Publication No. 2008-68729
PTL 3: Japanese Patent No. 4,200,907
PTL 4: Japanese Patent No. 3,957,874
PTL 5: Japanese Unexamined Patent Application Publication No. 2013-43471
PTL 6: Japanese Unexamined Patent Application Publication No. 2003-54449
PTL 7: Japanese Unexamined Patent Application Publication No. 2006-1500
PTL 8: Japanese Unexamined Patent Application Publication No. 2006-315555
PTL 9: Japanese Unexamined Patent Application Publication No. 2006-315556
PTL 10: Japanese Unexamined Patent Application Publication No. 2008-24185
PTL 11: Japanese Unexamined Patent Application Publication No. 2008-24192
PTL 12: Japanese Unexamined Patent Application Publication No. 2008-24193
PTL 13: International Publication No. 2011-80835
PTL 14: International Publication No. 2011-118016

SUMMARY OF INVENTION

Technical Problem

However, the arts disclosed in PTLs 1 to 4 are measures when the head of a pedestrian collides with the front side of the hood, and are less effective when the head of a pedestrian collides with the vicinity of the vertical wall on the lateral side of the hood.

The reason for this is that the vertical wall on the lateral side is disposed substantially parallel to the collision direction of the pedestrian's head. The vertical wall on the lateral side needs to deform so as to fall in a direction orthogonal to the load applying direction during the collision of the pedestrian head, and such deformation is less likely to occur compared to the vertical wall on the front side or the rear side, which only needs to undergo falling deformation parallel to the load direction.

The vertical wall on the lateral side also has a problem in that the steeper the angle of the vertical wall, the less likely deformation is to occur, and it is very difficult to achieve ensuring pedestrian protection performance in addition to the above-described hood rigidity and dent resistance.

Further, the corner part of the vertical wall, which often has a substantially truncated cone shape, is not likely to fall in either direction with respect to the load applying direction during the collision of the pedestrian head. For this reason, there is a problem in that compared to the vertical wall on the lateral side described above, deformation is less likely to occur, and the HIC value is more likely to be high.

The art disclosed in PTL 5 has a problem in that since a trim hole is set so as to include the bottom surface of the outer peripheral skeleton portion, the lower ridge forming the outer peripheral skeleton portion is divided, and the hood rigidity decreases significantly. Accordingly, the bottom surface of the outer peripheral skeleton portion connected to the automobile body becomes discontinuous, and the decrease in the rigidity and strength of the hood itself is problematic.

In the arts disclosed in PTLs 6 to 14, a trim hole is provided mainly in the vicinity of a bead setting part in the center of the hood so that the hood inner panel is easily deformed during a collision with a pedestrian, and this trim hole functions as a crash bead during a frontal collision between automobiles, and the collision performance is surely improved. However, the improvement in the head collision performance with the vicinity of an outer peripheral skeleton portion on the lateral side of a hood inner panel and the vicinity of a corner part, and an automobile hood structure that satisfies the frontal collision performance when automobiles collide head-on, and hood rigidity and strength have not been achieved.

It is an object of the present invention to provide an automobile hood structure and a hood inner panel thereof that are excellent in pedestrian head protecting performance during a collision with a pedestrian and hood rigidity.

Solution to Problem

To attain this object, in a first aspect of the present invention, a hood inner panel of an automobile hood structure includes an outer peripheral skeleton portion disposed at an outer peripheral portion and having an annular shape, the skeleton portion having a recessed-top cross sectional shape orthogonal to the circumferential direction of the annular shape, and an outer proximal surface extending inwardly from the outer peripheral skeleton portion and mastic-joined with a hood outer panel. A vertical wall connecting the outer proximal surface and a bottom surface of the outer peripheral skeleton portion is provided with a plurality of trim holes except for a ridge line where the vertical wall and the bottom surface meet and for the bottom surface.

The trim holes may be provided in a region above a shelf portion provided in the middle of the vertical wall.

In the hood inner panel, the shelf portion may be provided closer to the lower side of the body of the automobile than a position at half the height h of the vertical wall.

The trim holes may be on a line connecting crush beads that are provided on the outer peripheral skeleton portion from both lateral sides of the automobile inward in the vehicle width direction, and may be provided in the vertical wall on the inner side in the vehicle width direction of each crush bead.

The hood inner panel may include corner parts in the circumferential direction of the vertical wall, and the trim holes may be provided in regions including the corner parts.

An automobile hood structure according to a second aspect of the present invention has a reinforcing member between a hood inner panel of an automobile hood structure and the hood outer panel.

Advantageous Effects of Invention

A hood inner panel includes an outer peripheral skeleton portion disposed at an outer peripheral portion and having an annular shape, the skeleton portion having an recessed-top cross sectional shape orthogonal to the circumferential direction of the annular shape, and an outer proximal surface extending inwardly from the outer peripheral skeleton portion and mastic-joined with a hood outer panel. A vertical wall connecting the outer proximal surface and a bottom surface of the outer peripheral skeleton portion is provided with a plurality of trim holes except for a ridge line where the vertical wall and the bottom surface meet and for the bottom surface. Therefore, an automobile hood structure and a hood inner panel thereof that are excellent in pedestrian head protecting performance during a collision with a pedestrian and hood rigidity can be achieved.

DESCRIPTION OF EMBODIMENTS

Embodiments of the present invention will now be described in detail.
Embodiment 1

Figure 1:
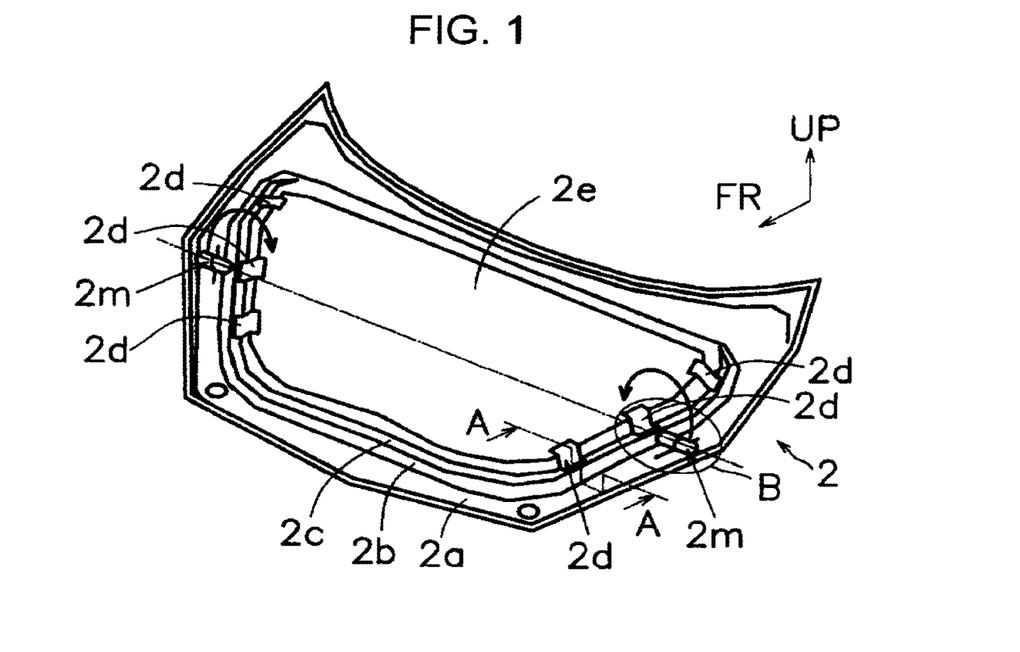
FIG. 1 is a schematic perspective view of a hood inner panel of an automobile hood structure of embodiment 1 of the present invention (with a hood outer panel removed).
Figure 2:
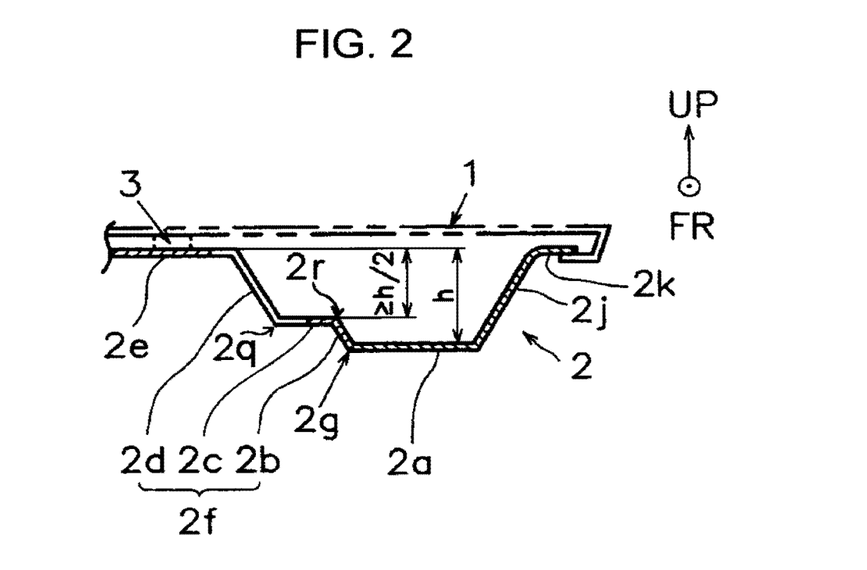
FIG. 2 is a sectional view taken along line A-A of the hood inner panel shown in FIG. 1.
Figure 3:
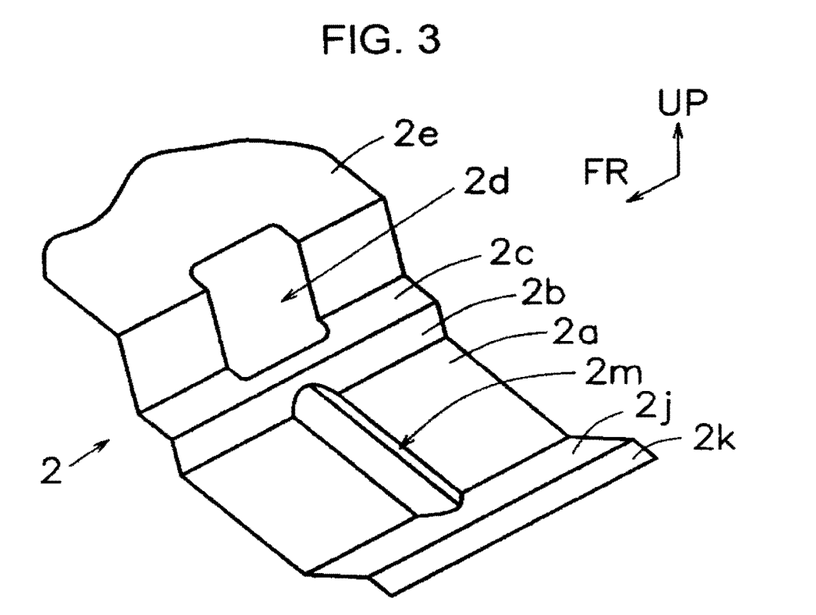
FIG. 3 is an enlarged view of part B of the hood inner panel shown in FIG. 1.

FIG. 1 is a schematic perspective view of a hood inner panel of an automobile hood structure of embodiment 1 of the present invention (with a hood outer panel removed), FIG. 2 is a sectional view taken along line A-A of the hood inner panel shown in FIG. 1, and FIG. 3 is an enlarged view of part B of the hood inner panel shown in FIG. 1.

In FIG. 1 to FIG. 3, reference sign 1 denotes a hood outer panel, and reference sign 2 denotes an outer peripheral skeleton portion of a hood inner panel. In these figures, reference sign 2a denotes a bottom surface of the outer peripheral skeleton portion 2, reference sign 2e denotes an outer proximal surface of the hood inner panel, and reference sign 2f denotes a vertical wall connecting the outer proximal surface 2e and the bottom surface 2a. In these figures, reference sign 2c denotes a shelf portion of the outer peripheral skeleton portion 2, reference sign 2b denotes a wall connecting the shelf portion 2c and the bottom surface 2a, and reference sign 2d denotes a trim hole provided in the vertical wall 2f. In these figures, reference sign 2g denotes a ridge line where the vertical wall 2f and the bottom surface 2a meet, reference sign 2j denotes an outermost wall of the outer peripheral skeleton portion 2, reference sign 2k denotes a flange portion extending outwardly from the outermost wall 2j, and reference sign 2m denotes a crush bead provided on the bottom surface 2a. Reference sign 3 denotes mastic resin as thermosetting adhesive resin. In the figures, arrow UP denotes a direction toward the upper side of the body of the automobile, and arrow FR denotes a direction toward the front of the body.

Although not shown here, recesses or protrusions (beads) for the purpose of ensuring panel rigidity and pedestrian protection performance, or trim holes for the purpose of reducing weight are formed on the outer proximal surface 2e as needed.

A hood inner panel of an automobile hood structure of embodiment 1 of the present invention includes a hood outer panel 1 and a hood inner panel. The hood inner panel includes an outer peripheral skeleton portion 2 disposed at an outer peripheral portion and having an annular shape, the skeleton portion having an recessed-top cross sectional shape orthogonal to the circumferential direction of the annular shape, and an outer proximal surface 2e extending inwardly from the outer peripheral skeleton portion 2 and mastic-joined with the hood outer panel 1 by means of mastic resin 3. The shape of the outer peripheral skeleton portion 2 defined by the term "annular" is not limited to a ring or circle in the geometric sense, but includes various shapes satisfying the condition of being a substantially endless shape. Such shapes include, particularly, a shape that is endless as a whole and that partially protrudes inward or outward. A vertical wall 2f connecting the outer proximal surface 2e and a bottom surface 2a of the outer peripheral skeleton portion 2 is provided with six trim holes 2d, three on each of both lateral sides of the automobile (hereinafter also referred to as "both lateral sides") of the vertical wall 2f, except for a ridge line 2g where the vertical wall 2f and the bottom surface 2a meet and for the bottom surface 2a. Of the three trim holes 2d provided on each of both lateral sides, the middle trim hole 2d is on a line connecting crush beads 2m that are provided on the outer peripheral skeleton portion 2 from both lateral sides of the automobile inward in the vehicle width direction, and is provided in the vertical wall 2f on the inner side in the vehicle width direction of each crush bead 2m.

In the present invention, the trim holes 2d only need to be provided in the vertical wall 2f except for the ridge line 2g and the bottom surface 2a. Thereby, the bottom surface 2a can be formed substantially annularly and continuously, and therefore the trim holes 2d can be set without significantly decreasing the rigidity as a hood.

The trim holes 2d function to promote the falling deformation of the vertical wall 2f when the head of a pedestrian collides. Thereby, in particular, the vertical wall 2f set on the inner side of the outer peripheral skeleton portion 2 on the lateral side can also be easily deformed during a head collision. By utilizing a space in the hood, the acceleration during a head collision can be reduced, the collision stroke can be increased, and the HIC value can also be reduced.

In this embodiment, the following configuration is used. Of the three trim holes 2d provided on each of both lateral sides of the automobile, the middle trim hole 2d is on a line connecting crush beads 2m that are provided on the outer peripheral skeleton portion 2 from both lateral sides of the automobile inward in the vehicle width direction. The middle trim hole 2d is provided in the vertical wall 2f on the inner side in the vehicle width direction of each crush bead 2m. In other words, as shown in FIG. 1, combinations of a crush bead 2m and a trim hole 2d are symmetrically provided on both lateral sides. Owing to these configurations, an automobile hood structure and a hood inner panel thereof that are excellent in pedestrian head protecting performance during a collision with a pedestrian and hood rigidity can be achieved, and in addition, an automobile hood structure and a hood inner panel thereof in which the frontal collision performance when automobiles collide head-on is ensured can be achieved.

However, it is preferable that the six trim holes 2d be provided in a region above the shelf portion 2c provided in the middle of the vertical wall 2f from the viewpoint of achieving characteristics excellent in pedestrian head protecting performance when colliding with a pedestrian, frontal collision performance when automobiles collide head-on, and hood rigidity (including a case where the trim holes are provided in the shelf portion). This configuration will be further described in detail below. Owing to such a configuration, a particular advantageous effect can be obtained such that the roles can be divided between a bottom surface 2a side region of the outer peripheral skeleton portion 2 in which, in order to ensure the hood rigidity and strength, no trim holes 2d are set, and an outer proximal surface 2e side region of the vertical wall 2f of the outer peripheral skeleton portion 2 in which a plurality of trim holes 2d are set in order to promote the falling deformation of the vertical wall 2f during a head collision. The ridge on the outer side of the shelf portion 2c (see reference sign 2r of FIG. 2) contributes to ensuring the rigidity of the bottom surface 2a of the outer peripheral skeleton portion 2, and the ridge on the inner side of the shelf portion 2c (see reference sign 2q of FIG. 2) functions as the start point, of falling deformation of the vertical wall 2f during the pedestrian head collision, and therefore this configuration is effective for both rigidity and pedestrian protection performance.

It is more preferable from the viewpoint described above in detail that, as in this embodiment, the upper surface of the shelf portion 2c be provided closer to the lower side of the body of the automobile than a position at half the height h of the vertical wall 2f. The reason for this is that the hood rigidity and strength are ensured as long as the ridge line 2g part of the bottom surface 2a of the outer peripheral skeleton portion 2 is provided with no weakening part and is continuous so that extreme stress concentration does not occur, whereas, as for the pedestrian head protecting performance, when the region in the vertical direction (arrow UP direction) cut by the trim hole 2d is too short, the vertical wall 2f cannot satisfactorily undergo falling deformation, and a predetermined pedestrian head protecting performance can hardly be obtained. These points were first made clear by the inventor.

When, as shown in FIG. 1, trim holes 2d are provided in the vicinity of a part on an extension in the vehicle width direction (direction orthogonal to a plane including arrow UP and arrow FR) of the crush beads 2m provided on the bottom surface 2a of the outer peripheral skeleton portion 2, in the vertical wall 2f extending substantially parallel to the front-rear direction of the automobile (direction including arrow FR) of the lateral side surface (surface parallel to a plane including arrow UP and arrow FR) of the hood, the trim holes 2d function as weakening holes during a head-on collision between automobiles. Thereby, folding deformation connecting the crush beads 2m and the trim holes 2d is likely to occur, and the hood is satisfactorily folded during an automobile collision, and therefore the advantage that plunging into the cabin is less likely to occur, that is, improvement in collision performance (frontal collision performance) when automobiles collide can also be obtained.

In combination with the trim holes 2d, in order for the material itself to have pedestrian head protecting performance and to satisfy shapability into a hood inner panel, it is preferable to use an Al—Mg—Si based AA or 6000 series aluminum alloy plate regulated by JIS. Supposing that this 6000 series aluminum alloy plate is shaped into a hood inner panel, is subjected to paint baking hardening treatment, and is used in an automobile body, as a characteristic after artificial age hardening treatment of 170° C.×20 minutes after imposing a pre-strain of 2%, it is preferable that 0.2% yield strength be 80 to 225 Mpa.

When such a 6000 series aluminum alloy plate is used, the preferable thickness t of a hood inner panel for exhibiting the above-described performances is about 0.6 mm to 1.2 mm.

The preferable position, size, number, interval of trim holes 2d for exerting the effect of promoting falling deformation are designed, of course, according to the shape and size of a hood inner panel and a vertical wall 2f in which the trim hole 2d are provided.

However, assuming the use of a 6000 series aluminum alloy plate having the above yield strength value and plate thickness in a hood inner panel, when a plurality of trim holes are provided at intervals, the preferable width of the trim holes 2d for exerting the effect of promoting falling deformation, of course, depends on the shape and size of a hood inner panel and a vertical wall 2f in which the trim hole 2d are provided, but, is preferably 0.5× h to 10× h mm, where h is the height of the vertical wall 2f of the hood inner panel.

Embodiment 2

Figure 4:
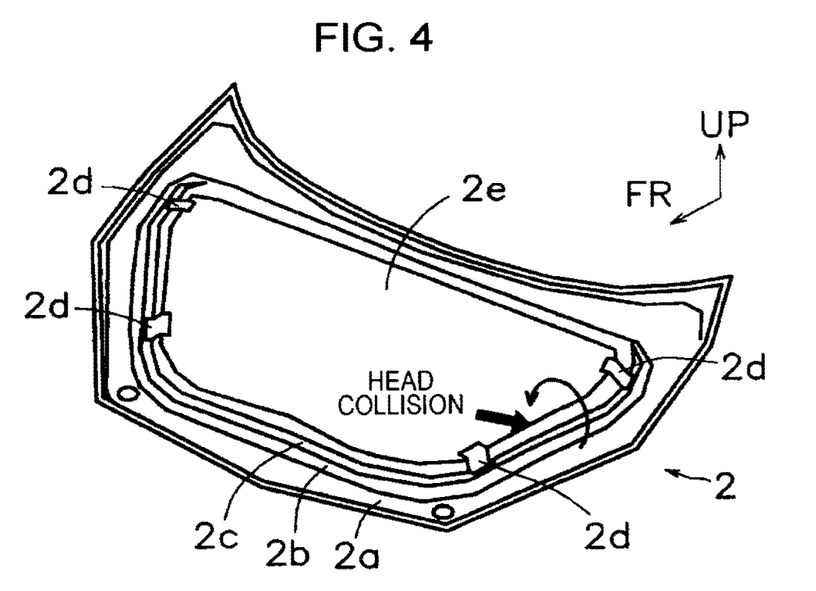
FIG. 4 is a schematic perspective view of a hood inner panel of an automobile hood structure of embodiment 2 of the present invention (with a hood outer panel removed).

FIG. 4 is a schematic perspective view of a hood inner panel of an automobile hood structure of embodiment 2 of the present invention (with a hood outer panel removed). This embodiment is the same as embodiment 1 except that, in embodiment 1 shown in FIG. 1, crush beads 2m are not provided and that two trim holes 2d are provided in the right-hand vertical wall 2f of FIG. 4 (three trim holes 2d are provided in FIG. 1). Therefore, the advantageous effects are the same as those of embodiment 1 except for the advantageous effect due to the existence of crush beads 2m described in detail in embodiment 1 and the advantageous effect due to the difference in the number of trim holes 2d provided in the right-hand vertical wall 2f. So, the same reference numerals will be used to designate the same components, and the detailed description will be omitted.

Embodiment 3

Figure 5:
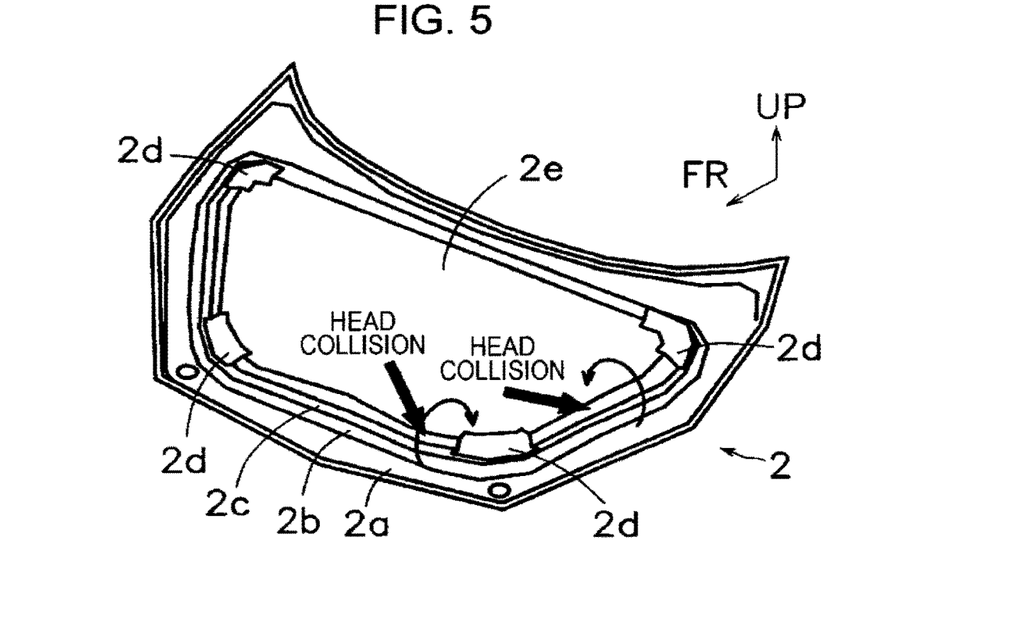
FIG. 5 is a schematic perspective view of a hood inner panel of an automobile hood structure of embodiment 3 of the present invention (with a hood outer panel removed).

FIG. 5 is a schematic perspective view of a hood inner panel of an automobile hood structure of embodiment 3 of the present invention (with a hood outer panel removed). This embodiment is characterized in that, in embodiment 2 shown in FIG. 4, the positions where trim holes 2d are provided are changed to regions including corner parts in the circumferential direction of the vertical wall 2f. Owing to such a configuration, when the pedestrian head collides with the vicinity of the vertical wall 2f on the lateral side, the vertical wall 2f is likely to undergo falling deformation toward the inner side in the vehicle width direction. In addition, because the vertical wall 2f is divided by the corner parts, an advantageous effect can be obtained such that, when the pedestrian head collides with the vicinity of the vertical wall 2f on the front side or rear side, the vertical wall 2f is also likely to undergo falling deformation toward the hood center.

Embodiment 4

Figure 6:
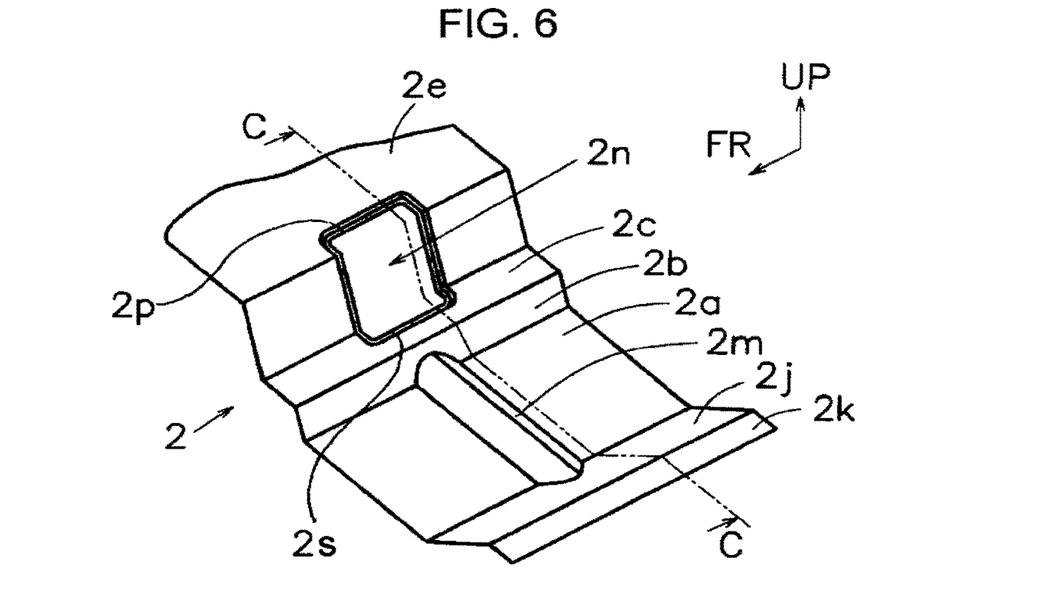
FIG. 6 is a partial enlarged schematic perspective view of a hood inner panel of an automobile hood structure of embodiment 4 of the present invention (with a hood outer panel removed).
Figure 7:
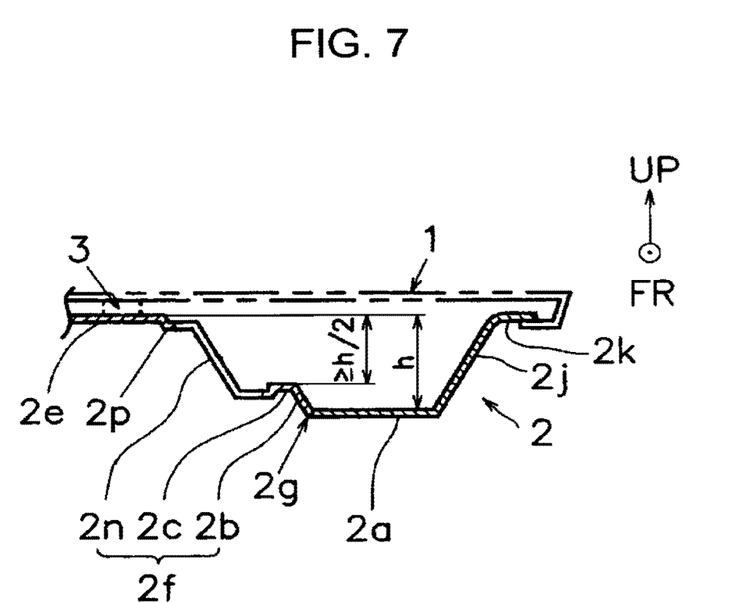
FIG. 7 is a sectional view taken along line C-C of the hood inner panel shown in FIG. 6.

FIG. 6 is a partial enlarged schematic perspective view of a hood inner panel of an automobile hood structure of embodiment 4 of the present invention (with a hood outer panel removed), and FIG. 7 is a sectional view taken along line C-C of the hood inner panel shown in FIG. 6. In this embodiment, trim holes 2d that are provided on a line in the vehicle width direction of crush beads 2m in embodiment 1 shown in FIG. 3 are changed to trim holes 2n. That is, this embodiment is the same as embodiment 1 except that the outer proximal surface 2e is provided with a seating surface lower than the outer proximal surface 2e (for example, a shallow seating surface having a depth of about 3 mm on the inner periphery of the trim hole 2n) 2p and that the shelf portion 2c is also provided with a similar seating surface 2s. Providing these seating surfaces 2p, 2s has the effect of causing the inner periphery of the trim hole 2n to surely have a desired shape. The same reference numerals will be used to designate the same components as those in embodiment 1, and the detailed description will be omitted.

This application claims priority to Japanese Patent, Application No. 2014-063771, filed Mar. 26, 2014, the entirety of which is hereby incorporated by reference.

REFERENCE SIGNS LIST 1 hood outer panel
2 outer peripheral skeleton portion of hood inner panel
2a bottom surface of outer peripheral skeleton portion 2
2b wall
2c shelf portion
2d, 2n trim hole
2e outer proximal surface
2f vertical wall connecting outer proximal surface 2e and bottom surface 2a
2g ridge line where vertical wall 2f and bottom surface 2a meet
2j outermost wall of outer peripheral skeleton portion 2
2k flange portion extending outwardly from outermost wall 2j
2m crush bead provided on the bottom surface 2a
2p seating surface
3 mastic resin

The invention claimed is:

1. A hood inner panel of an automobile hood structure, comprising:
an outer peripheral skeleton portion disposed at an outer peripheral portion of the hood inner panel and having an annular shape, the skeleton portion having a recessed top cross sectional shape which is recessed in a direction orthogonal to the circumferential direction of the annular shape to define a bottom surface of the outer peripheral skeleton portion; and
an outer proximal surface of the hood inner panel extending inwardly from the outer peripheral skeleton portion for mastic-joining with a hood outer panel, wherein the recessed top cross sectional shape defines a first substantially vertical wall connecting the outer proximal surface and the bottom surface of the outer peripheral skeleton portion, and a second substantially vertical wall connecting to the bottom surface of the outer peripheral skeleton portion at a side of the bottom surface that is opposite to the outer proximal surface, and wherein only the first substantially vertical wall of said first and second substantially vertical walls is provided with a plurality of trim holes, wherein vertically lower edges of the respective trim holes terminate on the first substantially vertical wall at a vertical position above the bottom surface.

2. The hood inner panel according to claim 1, further comprising a horizontal shelf portion provided at a vertically middle region of the first substantially vertical wall, wherein the trim holes are provided above the shelf portion.

3. The hood inner panel according to claim 1, wherein a shelf portion is provided closer to the bottom surface of the outer peripheral skeleton portion than a position at half the height h of the first substantially vertical wall.

4. The hood inner panel according to claim 1, wherein the trim holes are provided at both lateral sides of the automobile in the vehicle width direction, further comprising crush beads provided on the bottom surface of the outer peripheral skeleton portion at the both lateral sides of the automobile in the vehicle width direction, wherein the trim holes at both lateral sides of the automobile in the vehicle width direction are arranged on a line connecting the crush beads in the vehicle width direction.

5. A hood inner panel of an automobile hood structure, comprising:

an outer peripheral skeleton portion disposed at an outer peripheral portion of the hood inner panel and having an annular shape, the skeleton portion having a recessed top cross sectional shape which is recessed in a direction orthogonal to the circumferential direction of the annular shape to define a bottom surface of the outer peripheral skeleton portion; and an outer proximal surface of the hood inner panel extending inwardly from the outer peripheral skeleton portion and mastic-joined with a hood outer panel, wherein the recessed top cross sectional shape defines a substantially vertical wall connecting the outer proximal surface and the bottom surface of the outer peripheral skeleton portion, and wherein the substantially vertical wall is provided with a plurality of trim holes, wherein vertically lower edges of the respective trim holes terminate on the substantially vertical wall at a vertical position above the bottom surface, further comprising corner parts in the circumferential direction of the substantially vertical wall, and wherein the trim holes are provided in all of the corner parts.

6. An automobile hood structure comprising a hood outer panel and the hood inner panel according to claim 1.

7. The hood inner panel according to claim 4, further comprising three of said trim holes at each lateral side of the automobile in the vehicle width direction, wherein only the middle one of said trim holes at each lateral side of the automobile in the vehicle width direction is arranged on a line connecting the crush beads.

\* \* \* \* \*